United States Patent
Struhs et al.

(10) Patent No.: US 12,553,729 B2
(45) Date of Patent: Feb. 17, 2026

(54) METHOD AND DEVICE FOR CONTROLLING THE RANGE OF A BATTERY-OPERATED MOTOR VEHICLE

(71) Applicant: Volkswagen Aktiengesellschaft, Wolfsburg (DE)

(72) Inventors: Stefan Struhs, Braunschweig (DE); Markus Neumann, Vordorf (DE); Wjatscheslaw Krieger, Berlin (DE); Ann-Kathrin Eisner, Isenbüttel (DE); Christian Wurm, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 162 days.

(21) Appl. No.: 18/253,289

(22) PCT Filed: Nov. 4, 2021

(86) PCT No.: PCT/EP2021/080604
§ 371 (c)(1),
(2) Date: May 17, 2023

(87) PCT Pub. No.: WO2022/122258
PCT Pub. Date: Jun. 16, 2022

(65) Prior Publication Data
US 2024/0011783 A1    Jan. 11, 2024

(30) Foreign Application Priority Data
Dec. 10, 2020 (DE) ............ 10 2020 215 678.6

(51) Int. Cl.
*G01C 21/34* (2006.01)
*B60L 53/62* (2019.01)
(Continued)

(52) U.S. Cl.
CPC ........ *G01C 21/3469* (2013.01); *B60L 58/12* (2019.02); *B60L 53/62* (2019.02); *G07C 5/004* (2013.01)

(58) Field of Classification Search
CPC ........... G01C 21/3469; G01C 21/343; G01C 21/3484; G01C 21/3664; G01C 21/367;
(Continued)

(56) References Cited

U.S. PATENT DOCUMENTS

| | | | |
|---|---|---|---|
| 5,790,976 A | 8/1998 | Boll et al. | 455/456.5 |
| 7,237,203 B1 | 6/2007 | Kuenzner | 715/764 |

(Continued)

FOREIGN PATENT DOCUMENTS

| | | | | |
|---|---|---|---|---|
| CN | 108981736 B | * | 3/2021 | ........ G01C 21/3469 |
| DE | 19519107 C1 | | 4/1996 | ............. B60L 11/18 |

(Continued)

OTHER PUBLICATIONS

"Sweda, Timothy; et. al.; Optimal Recharging Policies for Electric Vehicles; Mar. 5, 2013; Operations Research; Manuscript 1" (Year: 2013).*

(Continued)

*Primary Examiner* — Ramya P Burgess
*Assistant Examiner* — Christopher R Cardimino
(74) *Attorney, Agent, or Firm* — Slayden Grubert Beard PLLC

(57) ABSTRACT

The disclosure relates to a method and a device for controlling the range of a motor vehicle. The method comprises the identification of a navigation destination. The method also comprises the identification of a target residual range to be achieved at the navigation destination. A navigation route to the navigation destination via at least one charging stopover is determined, wherein furthermore minimum states of charge of a battery to be achieved at the at least one charging (Continued)

stopover are determined in such a way that the motor vehicle has a residual range upon arrival at the navigation destination which corresponds at least to the identified target residual range.

19 Claims, 4 Drawing Sheets

(51) Int. Cl.
*B60L 58/12* (2019.01)
*G07C 5/00* (2006.01)

(58) Field of Classification Search
CPC . G01C 21/3697; G01C 21/3415; B60L 58/12; B60L 53/62; B60L 2260/52; B60L 2260/54; B60L 58/13; G07C 5/004; Y02T 10/70; Y02T 90/16
See application file for complete search history.

(56) References Cited

U.S. PATENT DOCUMENTS

| | | | | |
|---|---|---|---|---|
| 8,390,246 | B2 | 3/2013 | Taguchi et al. | 320/104 |
| 9,810,543 | B2* | 11/2017 | Hoch | G01C 21/343 |
| 10,023,176 | B2 | 7/2018 | Tabanoglu et al. | |
| 10,436,601 | B2 | 10/2019 | Gilman et al. | |
| 10,552,923 | B2* | 2/2020 | Cun | B60L 53/65 |
| 11,340,083 | B2* | 5/2022 | Wilding | H04W 4/024 |
| 11,573,093 | B2* | 2/2023 | Chae | G01C 21/3469 |
| 11,846,518 | B2* | 12/2023 | Cussigh | G01C 21/3679 |
| 2011/0238287 | A1 | 9/2011 | Hayashi | 701/532 |
| 2012/0309455 | A1* | 12/2012 | Klose | B60L 53/68 455/557 |
| 2013/0261953 | A1* | 10/2013 | Kiyama | G01C 21/3469 701/400 |
| 2015/0112526 | A1 | 4/2015 | Martin et al. | 701/22 |
| 2015/0354974 | A1* | 12/2015 | Takehara | B60L 53/66 701/423 |
| 2016/0356616 | A1 | 12/2016 | Woon et al. | 701/123 |
| 2016/0363456 | A1 | 12/2016 | Pujos et al. | 701/467 |
| 2017/0030728 | A1* | 2/2017 | Baglino | G01C 21/3469 |
| 2018/0111492 | A1* | 4/2018 | McCool | B60L 53/12 |
| 2019/0186932 | A1 | 6/2019 | Milding et al. | |
| 2020/0333148 | A1* | 10/2020 | Qiu | G01C 21/3476 |
| 2022/0090928 | A1 | 3/2022 | Cussigh et al. | |

FOREIGN PATENT DOCUMENTS

| | | | | |
|---|---|---|---|---|
| DE | 102008035460 A1 | 5/2009 | | B60K 35/00 |
| DE | 102010040125 A1 | 3/2011 | | G01R 31/36 |
| DE | 102010038539 A1 | 2/2012 | | B60K 35/00 |
| DE | 102012200112 A1 | 7/2012 | | B60R 16/02 |
| DE | 102012003292 A1 * | 6/2013 | | G01C 21/3469 |
| DE | 102012210103 A1 | 12/2013 | | G08G 1/09 |
| DE | 102013216635 A1 | 2/2015 | | G01C 21/36 |
| DE | 102014221223 A1 | 4/2015 | | B60W 20/00 |
| DE | 102014226031 A1 | 6/2016 | | B60L 50/15 |
| DE | 102016209494 A1 | 12/2016 | | B60K 35/00 |
| DE | 102016217087 A1 | 3/2018 | | B60L 11/18 |
| DE | 102018203392 A1 | 9/2019 | | G01C 21/34 |
| DE | 102018209997 A1 | 12/2019 | | G07C 5/08 |
| DE | 102018215722 A1 | 3/2020 | | B60W 30/182 |
| DE | 102019101094 A1 | 7/2020 | | G01C 21/34 |
| DE | 102019204217 A1 | 10/2020 | | G08G 1/0969 |
| DE | 102019130058 A1 | 5/2021 | | B60W 20/12 |
| DE | 102020215678 A1 | 6/2022 | | B60W 20/12 |
| EP | 1106418 B1 | 6/2001 | | B60K 35/00 |
| EP | 2741052 B1 | 6/2014 | | G01C 21/34 |
| EP | 2759439 A1 | 7/2014 | | G06K 37/02 |
| EP | 2717016 B1 * | 5/2020 | | G01C 21/3469 |
| JP | 2013017290 A2 | 1/2013 | | B60L 3/00 |
| WO | 2022/122258 A1 | 6/2022 | | B60L 58/13 |

OTHER PUBLICATIONS

"Wang, Guibin; et. al.; Traffic-Constrained Multiobjective Planning of Electric-Vehicle Charging Stations; Oct. 2013; IEEE Transactions on Power Delivery, vol. 28, No. 4" (Year: 2013).*
German Office Action, Application No. 102020215678.6, 7 pages, Jul. 6, 2021.
International Search Report and Written Opinion, Application No. PCT/EP2021/080604, 18 pages, Feb. 10, 2022.

* cited by examiner

METHOD AND DEVICE FOR CONTROLLING THE RANGE OF A BATTERY-OPERATED MOTOR VEHICLE

CROSS-REFERENCE TO RELATED APPLICATIONS

This application claims priority to German Patent Application No. DE 10 2020 215 678.6, filed on Dec. 10, 2020 with the German Patent and Trademark Office. The contents of the aforesaid Patent Application are incorporated herein for all purposes.

TECHNICAL FIELD

The invention relates to a method and a device for controlling the range of a battery-operated motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A relatively short range and low density of charging stations regularly require the user of a battery-operated motor vehicle to plan a route carefully, including stopovers, in order to reach a remote navigation destination.

For battery-operated motor vehicles, therefore exist range control systems or range management systems, frequently integrated in navigation systems, that automatically determine a navigation route to a navigation destination via charging stopovers. Furthermore, numerous monitoring systems and display systems are known for communicating the state of charge of the battery to the user.

Automatic charging stop planning is typically oriented around standard settings or maximum settings by the user that establish the state of charge to be achieved at the particular charging stopover. However, this has the following disadvantages: For example, the charging times can be unnecessarily long at the charging stopover if a too high charging setting, i.e., a too high target state of charge, was selected. In cases in which a too low charging setting is selected, i.e., a too low target state of charge, too many charging stopovers must be made. In both cases, time insufficiencies are a negative consequence of such fixed user settings.

Furthermore, navigation planning and vehicle settings have been previously independent of each other. This means that navigation planning has not previously allowed the adaptation of the range to the navigation destination.

For users who do not have a home wall box or a suitable socket for charging the battery, it is necessary, beyond the above described problems, to also include the following trip in route planning after arrival at the navigation destination.

Currently, charging settings and the planning of charging stops are set manually by the user. Manual adaptation and planning are, however, not user-friendly and can result in miscalculations. In particular, the non-linear relationship between the range and state of charge of batteries as well as their dependence on other influential factors are difficult for the user to calculate.

SUMMARY

A need exists to provide a method for range control that at least partially solves the aforementioned problems. The need is addressed by the subject matter of the independent claims.

Embodiments of the invention are described in the dependent claims, the following description, and the drawings.

DESCRIPTION

Figure 1:
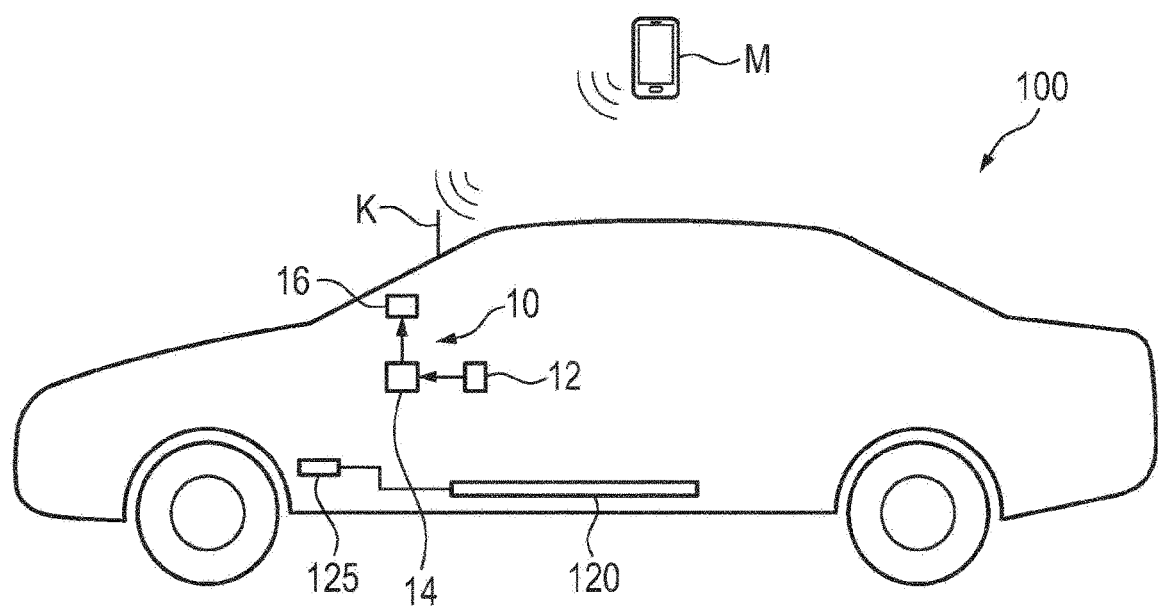
FIG. 1 shows a motor vehicle with a device for range control according to an embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, recording can be accomplished by a user entry, for example as a text entry or voice entry. In other words, the target residual range is a range of the motor vehicle or the battery that the motor vehicle has or should have for a subsequent trip at the navigation destination. The navigation destination can be a final destination of a trip, or a defined intermediate destination of a route. A method comprises determining at least one charging stopover, in particular two, three, four, five or more than five charging stopovers depending on the route, i.e., the distance to the navigation destination. In other words, the determined navigation route comprises determined charging stopovers and associated determined minimum states of charge to be achieved. A state of charge can for example be a state of charge (SoC), for example expressed in percent. In other versions, absolute values can also be used for the state of charge that characterize the state of charge. If several charging stopovers are ascertained, a particular minimum state of charge to be achieved can be assigned to each charging stopover or determined. These can accordingly differ from charging stopover to charging stopover. The motor vehicle can be a purely electrically operated motor vehicle, wherein in other embodiments, the motor vehicle can be a plug-in hybrid. Intermediate charging stopovers can be correspondingly taken into account automatically. Moreover, charging presets can be made, and/or intermediate destinations can be recorded by user input which are to be reached by the navigation route.

The teachings herein have the benefit that a navigation route with charging stopovers and minimum states of charge is determined that provide an extended range at the destination. Unnecessarily long charging times or unnecessary charging stopovers may thereby be reduced. The user furthermore does not have to personally plan a residual range and can adhere to the specifications, i.e., the charging stopovers and the associated minimum states of charge to be achieved. This ensures that the user will not only reach the navigation destination but also will have a given residual range at the navigation destination. In turn, this has the benefit that there is at least one defined range for a following trip, and the user does not have to immediately search for a closest charging station. There is a nonlinear relationship between the state of charge and the range that is used by the teachings herein in order to achieve the required range at the navigation destination by setting the minimum states of charge at the charging stopovers. Other embodiments result from the remaining features specified in the dependent claims.

In some embodiments, the method comprises determining the navigation route to the navigation destination such that the motor vehicle, upon arrival at the navigation destination, has a residual range that corresponds to the recorded target residual range. The correspondence is beneficial because it therefore provides a navigation route with stopovers and minimum states of charge that furthermore minimize the charging times.

In some embodiments, the method comprises determining the minimum state of charge to be achieved at the at least one charging stopover on the basis of a route to a closest charging stopover or to the navigation destination. A route in this case is in other words a travel route. The distance to the closest charging stopover is relevant to the minimum state of charge to be achieved. Said routes can also be employed to determine the charging stopovers to be used.

In some embodiments, the method comprises determining the minimum state of charge to be achieved on the basis of a charging speed at the at least one charging stopover. The background of this is that the charging speed can differ widely at different charging stations. Accordingly, the driving time can be effectively minimized when, for example, only a short time is spent at charging stations with a slower charging speed in comparison to charging stations with a faster charging speed at which a high minimum state of charge can be achieved with a short charging time. Due to this dependency, time optimization can take place, and the navigation route can therefore provide an effective, faster driving route. Said charging speed can also be employed to determine the charging stopovers to be used.

In some embodiments, the method comprises determining the minimum state of charge to be achieved on the basis of energy consumption. Energy consumption in other words is a discharging speed of the battery during use. This strongly depends on the driving style and many other influential factors such as the wind, temperature, etc. By determining the energy consumption, this quantity can be used to determine the minimum state of charge. Said energy consumption can also be employed to determine the charging stopovers to be used.

In some embodiments, the method comprises determining a charging time until the minimum state of charge is achieved at the at least one charging stopover on the basis of the charging speed at the charging stopover, an ascertained arrival state of charge, and the minimum state of charge to be achieved at the at least one charging stopover. The charging time can be important to the user in order to be able to plan the effective driving time, or also in order to be able to schedule the waiting time or dwell time.

In some embodiments, the method comprises displaying the charging time, and/or the arrival state of charge, and/or the minimum state of charge to be achieved at the at least one charging stopover on a display. On the one hand, this allows the user to be comprehensively informed, and he can also correspondingly adapt his driving behavior when, for example, low arrival states of charge are displayed at stopovers. The charging time is furthermore helpful for effectively calculating drive time.

In some embodiments, the method comprises showing a graphic charging display on a display during the charging process at the at least one charging stopover, wherein the charging display comprises a movable state of charge object which is indicative of the actual state of charge of the battery, and a charging target object which is indicative of the minimum state of charge to be achieved. This illustratively visualizes for the user when he has reached the certain minimum state of charge. The minimum state of charge to be achieved furthermore overwrites or overrides any charging presets by the driver.

In some embodiments, the method comprises transmitting to a mobile terminal a signal which is indicative of achieving the minimum state of charge to be achieved at the at least one charging stopover. The user therefore does not have to personally monitor the charging process while charging and does not have to wait at the vehicle and can, for example, also move away from the charging pole. The mobile terminal is for example a tablet, a cell phone, a laptop, etc. For example, a vehicle application can be provided with a vehicle link.

In some embodiments, the method comprises recording a charging stop residual range to be achieved at the at least one charging stopover and determining the navigation route such that the motor vehicle has a residual range at the at least one charging stopover which corresponds to at least the recorded charging stop residual range. In this case as well, a correspondence between the charging stop residual range to be achieved and residual range at the charging stopover is particularly beneficial. The user accordingly has a range safety buffer at the automatically planned charging stopover. The charging stop residual range in this case is defined as the range upon arrival at the charging station, i.e., before charging. The navigation route and the minimum states of charge at the previous charging stopover(s) are then calculated so that the recorded charging stop residual range is also fulfilled at the charging stops. This provides safety for the user by ensuring that charging stops are reached with a sufficient arrival state of charge. For example, the recorded charging stop residual range is the same at all charging stops. Tight navigation routes with very low arrival states of charge can therefore be avoided.

The method comprises recording an additional charging stopover and furthermore determining the navigation route via the additional charging stopover while determining a minimum state of charge to be achieved at the additional charging stopover such that the motor vehicle has a residual range upon arrival at the navigation destination which corresponds to at least the recorded target residual range. Such an additional stopover can also be termed a manual stopover. This is a stopover that is not automatically planned. The user can accordingly include other charging stopovers according to his preferences, for example for lunch breaks. The navigation route is correspondingly redetermined, for example using new charging stopovers and/or new minimum states of charge so that the required residual range at the navigation destination and/or the charging stop residual ranges are again fulfilled at the charging stopovers. This makes the method adaptive and robust in light of such manual stopovers without changing the residual range at the navigation destination.

In some embodiments, the method comprises continuously determining the navigation route, or determining the navigation route at determined intervals in time. This makes the navigation route adaptive and adaptable. For example, changing parameters such as energy consumption or also additional stopovers planned manually by the user can result in a redetermination or replanning of the navigation route, wherein the recorded target residual range is achieved.

In some embodiments, the method comprises determining the navigation route to the navigation destination on the basis of the state of charge of battery. The state of charge, in particular upon recording the navigation destination and residual range, influences for example the determination of the first charging stopover.

In another example aspect, a device for range control for a motor vehicle is proposed, wherein the device is designed to perform the method according to one of the embodiments. The device, for example a navigation device, can in particular comprise a control unit that performs the method steps.

In another example aspect, a motor vehicle is proposed with an above-described device for range control. The motor vehicle is in particular a battery-operated motor vehicle, for example a plug-in hybrid, or a purely electric vehicle.

The various embodiments mentioned in this application can beneficially be combined with one another, unless designed otherwise in individual cases.

The invention will in the following be discussed using further example embodiments based on the associated drawings. Specific references to components, process steps, and other elements are not intended to be limiting. Further, it is understood that like parts bear the same or similar reference numerals when referring to alternate FIGS.

FIG. 1 shows a motor vehicle 100 and a device 10 for range control. The device 10 for range control can be provided or integrated in the motor vehicle 100. The motor vehicle 100 can furthermore comprise a battery 120, for example in the floor region of the motor vehicle 100. Furthermore, an electric motor 125 or an electric machine is schematically provided. The battery 120 of the motor vehicle 100 is chargeable, i.e., the battery 120 can be charged by a charging station.

The motor vehicle 100 can furthermore comprise a sensor 12, or a sensor group, or a sensor system. The sensor 12 can be configured to record energy consumption and/or the state of charge of the battery 120, or other relevant monitoring parameters of the battery 120. Furthermore, position data of the motor vehicle 100 can also be recorded. The device 10 for range control can receive the ascertained sensor values from the sensor 12 and then also process them.

A control unit 14 of the device 10 can be configured to determine navigation routes via charging stopovers in combination with minimum states of charge at the charging stopovers under the requirement of a given target residual range at the navigation destination. This is described in greater detail in the embodiments below. Corresponding digital maps and stored navigation data comprising for example charging stopovers and for example also their charging speeds can be provided that the control unit 14 can access for this determination. The control unit 14 is furthermore configured to determine minimum states of charge at the charging stopovers as described in greater detail in the embodiments below.

The control unit 14 can furthermore be configured to control a display 16. The display 16, also termed a display apparatus, can graphically send the determined navigation route and other information on a screen to the user.

Moreover, the motor vehicle 100 can comprise a communication interface K for exchanging signals with a mobile terminal M.

Furthermore, the device 10 comprises at least one interface, i.e., in particular an input interface so that entries by the user can be recorded by the control unit 14. For example, such an interface can be realized by a touch-sensitive display 16, wherein the present teachings are not restricted thereto. The control unit 14 can furthermore be configured to perform the embodiments of the method for range control described in the following.

In the following, FIG. 2 and FIG. 3 will be described in greater detail to illustrate the method for range control for a battery-operated motor vehicle 100.

A navigation destination N is first recorded. To this end, an interface for example as a touch-sensitive entry field on a display 16, can be provided. The navigation destination N can for example be entered in the form of a destination address. The navigation destination N can for example be a final destination of a trip, or a defined intermediate destination of a trip.

Furthermore, a target residual range R0 is recorded that is to be achieved at the navigation destination N by the motor vehicle 100 or the battery 120. Expressed in other words, the target residual range R0 is a desired target residual range R0 at the navigation destination N. FIG. 2 shows an exemplary setting view 20 on the display 16 for entering the target residual range R0.

In this embodiment, a value can be set for the desired target residual range R0 by a slider 22, in this case for example in kilometers, wherein an exemplary value of 90 km is set for the target residual range R0. Furthermore, the target residual range R0 can be set more precisely using one or more buttons 24. In the present embodiment, an interval of target residual ranges R0 is furthermore specified. The present teachings are, however, not limited to the special type of setting of the target residual range R0. In other embodiments, a target residual range R0 can, for example, also be set without an the interval restriction or entered directly as a numeric number.

Figure 2:
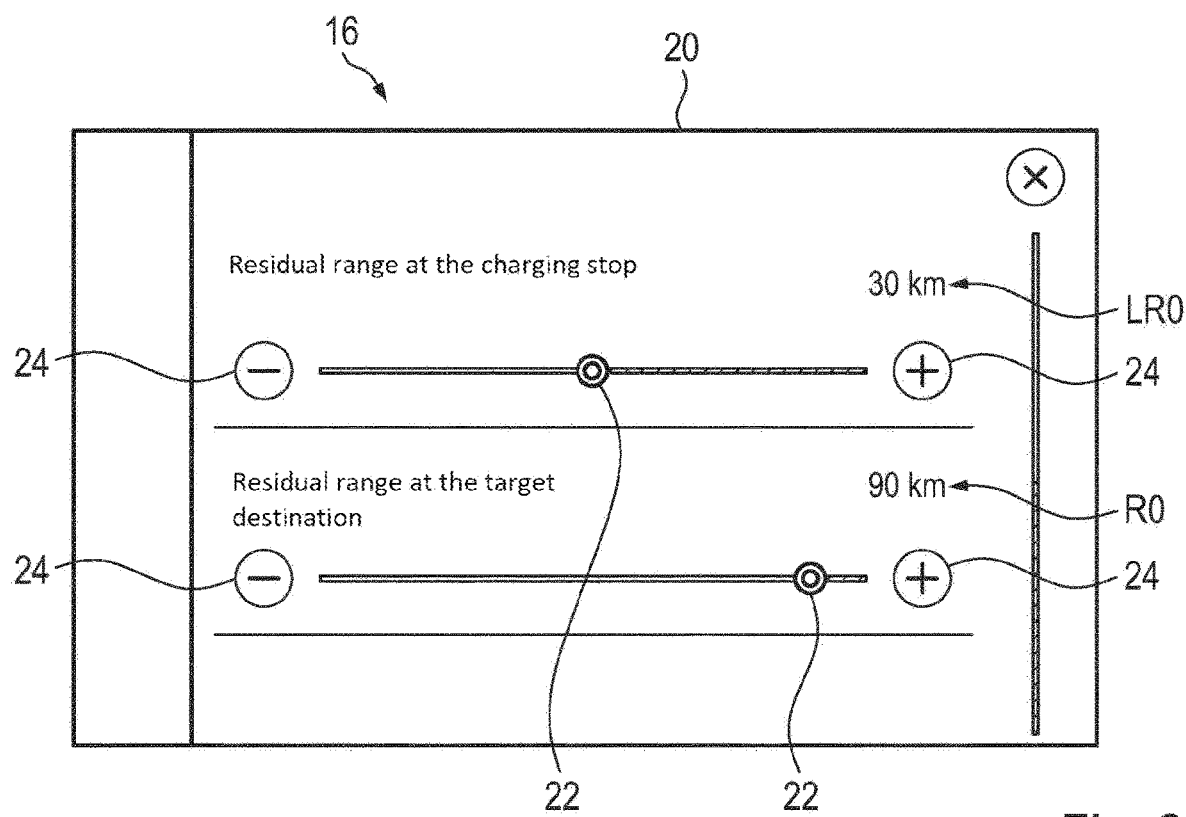
FIG. 2 shows an input interface according to an embodiment.

Furthermore as can be seen in FIG. 2, a charging stop residual range LR0 can be set in the same way, which will be described in greater detail below. Furthermore, charging stopovers can be automatically taken into account (not expressly shown here). Moreover, charging presets can be made and/or intermediate destinations can be recorded by user input which are to be reached by the navigation route.

Figure 3:
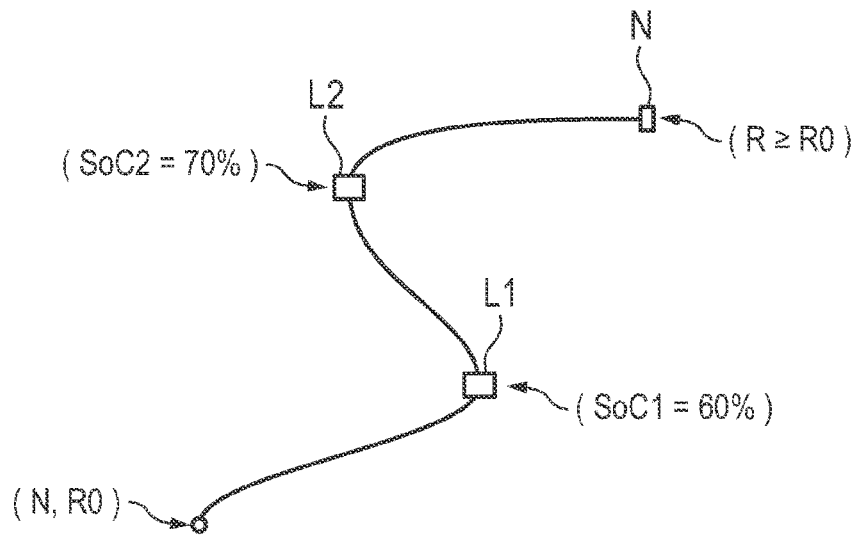
FIG. 3 shows an illustration of a determined navigation route according to a first embodiment.

In another step as illustrated in FIG. 3 for example, a navigation route to the navigation destination N via at least one charging stopover L1, L2 is determined. This is done in particular when the distance to the navigation destination N is greater than or only slightly less than the range of the battery 120. For each charging stopover L1, L2, a minimum state of charge SoC1, SoC2 of the battery 120 to be achieved is determined. This means in other words that a navigation route is determined which is characterized by establishing or determining determined charging stopovers L1, L2, and establishing or determining minimum states of charge SoC1, SoC2. By the combination of charging stopovers and minimum states of charge, the target residual range R0 at the navigation destination N can be achieved. The minimum state of charge SoC1, SoC2 in this context designates the state of charge at least to be achieved at the end of the charging process at the respective charging stopover L1, L2. The minimum states of charge SoC1, SoC2 can differ from each at different charging stopovers L1, L2.

The navigation route via the determined charging stopovers L1, L2 with the respective minimum states of charge SoC1, SoC2 is determined through the control unit 14 such that the motor vehicle 100 has a residual range R when the navigation destination N is reached which at least corresponds to the recorded target residual range R0. The navigation route in other words is configured so that at least the recorded target residual range R0 is available at the navigation destination N. This is achieved by the charging stopovers L1, L2 with the associated minimum states of charge SoC1, SoC2. A plurality of navigation routes can also fulfill the residual range R0 at the navigation destination N. In such cases, the user can make a selection from the different navigation routes.

An example of a navigation route is shown in FIG. 3 on a highly simplified map. In this exemplary case, the determined navigation route runs via two charging stopovers L1, L2 to a recorded navigation destination N. At the first charging stopover L1, a minimum state of charge SoC1 of 60% to be achieved is determined. At a second charging stopover L2, a minimum state of charge SoC2 of for example 70% is determined. Here as well, it is emphasized that the state of charge can also be shown in other quantities. The navigation route, i.e., comprising the determined charging stopovers L1, L2 and the associated determined minimum states of charge SoC1, SoC2, ensures a residual range R at the navigation destination. At the navigation destination N, a residual range value R is achieved which corresponds at least to the entered residual range R0 while maintaining the determined charging stopovers and the minimum states of charge SoC1, SoC2. This reduces the number of charging stops and charging times, and the driver is relieved in planning with regard to the following trips.

In the present embodiments, the navigation route is configured or determined so that the motor vehicle 100 has a residual range R upon arrival at the navigation destination N that corresponds with the recorded target residual range R0. The user therefore has precisely the residual range R available at the navigation destination R0 that was entered or recorded. Furthermore, unnecessarily long dwell times or charging times are therefore not spent at a charging stopover L1, L2.

The determination of the minimum states of charge SoC1, SoC2 as well as the determined charging stopovers L1, L2, i.e. the determination of the navigation route, can be determined on the basis of influencing parameters. An influencing parameter is the distance to the next charging stopover L1, L2, or the distance to the navigation destination N, i.e. the respective minimum states of charge at the at least one charging stopover L1, L2.

In the example in FIG. 2, the minimum state of charge SoC1 must be determined such that the motor vehicle 100 can reach the charging stopover L2 over the distance. For example at the charging stopover L2, the minimum state of charge SoC2 to be achieved must be determined so that the recorded residual range R0 at the navigation destination N can be achieved. Furthermore, unnecessary charging stopovers can be bridged by determining suitable minimum states of charge, and the number of charging stopovers can accordingly be reduced.

Furthermore, the charging stopovers L1, L2 and/or the minimum states of charge SoC1, SoC2 to be achieved can be determined on the basis of a charging speed at the charging stopovers. For example, charging stations or charging poles with a fast charging speed can be prioritized for short charging times. Furthermore, the navigation route can be determined so that when a charging station with a low charting speed is needed, a minimum charging state to be achieved is specified. This can reduce the dwell time for charging.

Furthermore, the energy consumption can be taken into account, i.e., the minimum state of charge to be achieved and/or the charging stopovers can be determined on the basis of energy consumption. For example, a fixed energy consumption can be used for the determination. The energy consumption can also for example be ascertained using sensor data from the sensor 12 during the trip. For example, another charging stopover can be planned when the energy consumption is too high, or conversely a previously planned charging stopover is omitted. Otherwise, the minimum states of charge can be adapted at one or more charging stopovers. Furthermore, the navigation route, i.e., the charging stopovers and the minimum states of charge SoC1, SoC2 at the navigation destination can be determined based on the state of charge of the battery 120. For example, the state of charge of the battery determines in particular the next charging stopover.

The navigation route can, as described above, be adapted at any time. Expressed in other words, the navigation route can accordingly be determined continuously over time. For example, the determined minimum states of charge SoC1, SoC2 can be adapted continuously over time, or determined charging stopovers L1, L2 can be changed, i.e., updated. Furthermore, the navigation route can also be determined at certain intervals of time.

Figure 4:
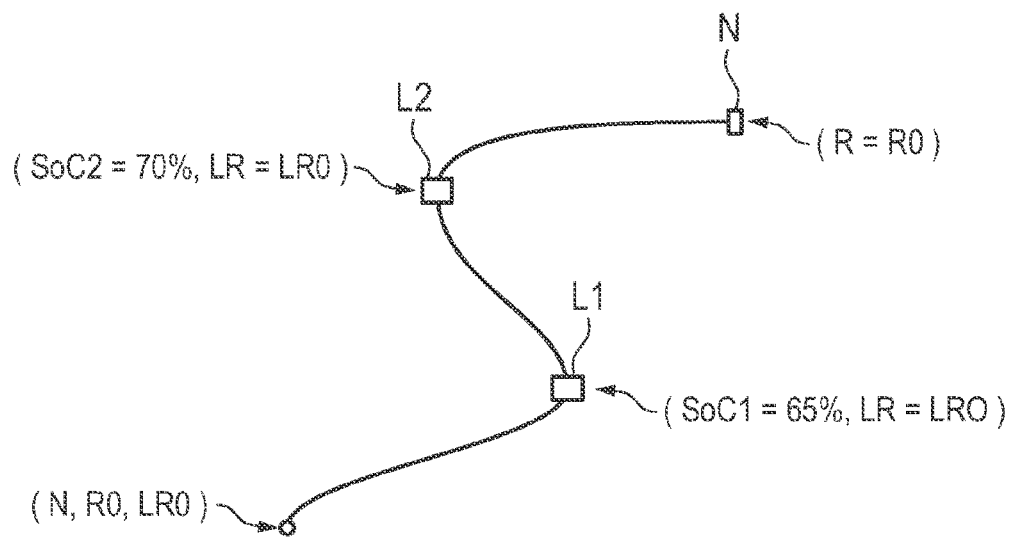
FIG. 4 shows an illustration of a determined navigation route according to a second embodiment.

FIG. 4 illustrates a determined navigation route according to a second embodiment. In the following, only differences from the above portrayal will be described. For the above features or definitions, reference is made to the above description.

In this embodiment, the method can furthermore comprise recording a charging stop residual range LR0 to be achieved at the at least one charging stopover L1, L2 as for example shown in FIG. 2. A user entry can for example be recorded using a slider 22. A value of 30 km is set in FIG. 2. Furthermore, the charging stop residual range LR0 can be set more precisely using buttons 24. However, the teachings herein are not limited to such a setting. In the present embodiment, an interval of charging stop residual ranges LR0 is specified, wherein in other embodiments, a charging stop residual range LR0 can also be set without an interval restriction, for example by entering numeric values. For example, this charging stop residual range LR0 is imposed equally for all charging stopovers L1, L2. In other embodiments, the assignment can be individualized.

The navigation route as illustrated in FIG. 4 is also determined so that the charging stop residual range LR at the at least one charging stopover L1, L2 corresponds with the recorded charging stop residual range LR0. The navigation route must therefore fulfill another condition. Such a charging stop residual range LR0 can for example be generally established for each of the charging stopovers L1, L2 as shown in FIG. 4. In the present case for example, the first minimum state of charge SoC1 to be achieved is increased in comparison to the embodiment in FIG. 3 in order to have the required charging stop residual range LR0 at the charging stopover L2. This ensures a range buffer for each charging stopover L1, L2. Accordingly, tightly configured navigation routes can be excluded, and the user has additional security of reaching the next charging station.

Figure 5:
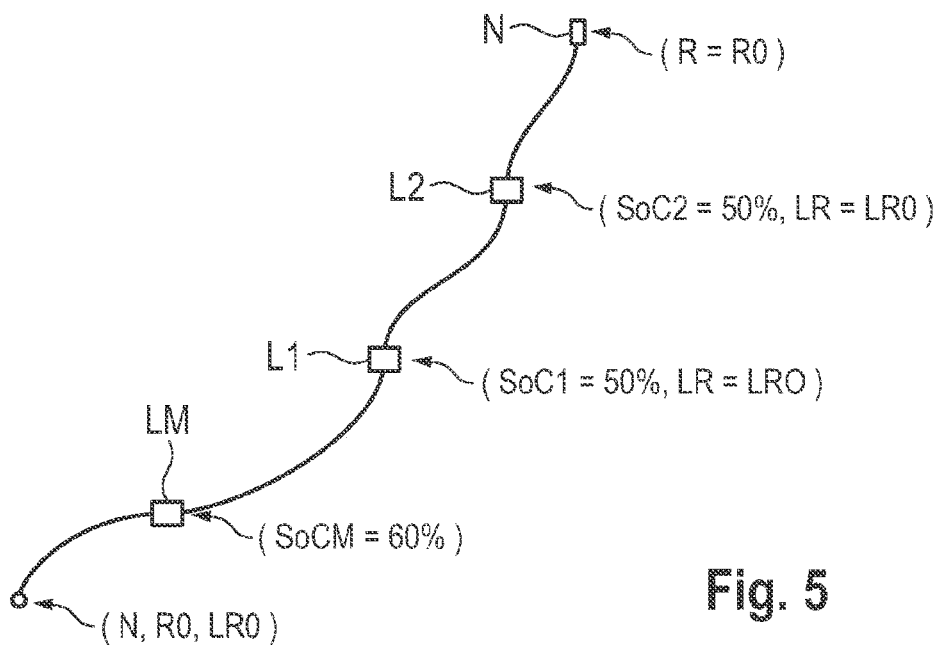
FIG. 5 shows an illustration of a determined navigation route according to a third embodiment.

FIG. 5 illustrates a determined navigation route according to a third embodiment. In the following, only differences from the above portrayals will be described. For the above features or definitions, reference is made to the above descriptions. The embodiment can be combined both with FIG. 3 and with FIG. 4.

In this embodiment, an additional manual charging stopover LM is recorded. This charging stopover LM is for example manually entered by the user. In this case, a navigation route is furthermore determined via the additional charging stopover LM while determining a minimum state of charge SoCM to be achieved at the additional charging stopover LM. In this embodiment, the determination is carried out such that the motor vehicle 100 has a residual range R upon arrival at the navigation destination N that at least corresponds to the recorded target residual range R0.

The navigation route is in this case recalculated, for example by means of new charging stopovers and/or new minimum states of charge so that the required residual range R0 at the navigation destination and/or the charging stop residual ranges LR0 are again fulfilled at the charging stopovers as shown for example in FIG. 5.

In the present example, a minimum state of charge of SoCM of 70% to be achieved is determined at the additional charging stopover LM. Due to the manual charging stopover LM, other charging stopovers L1, L2 have for example been scheduled. Furthermore by means of the new navigation route, the charging stop residual ranges LR0 at the charging stopovers L1, L2 can also be achieved. In this example, it was necessary to replan the route in comparison to FIGS. 3 and 4 to do this. The method is adaptable so that the residual ranges R0 and LR0 can also be achieved even when there are manual charging stopovers LM.

Figure 6:
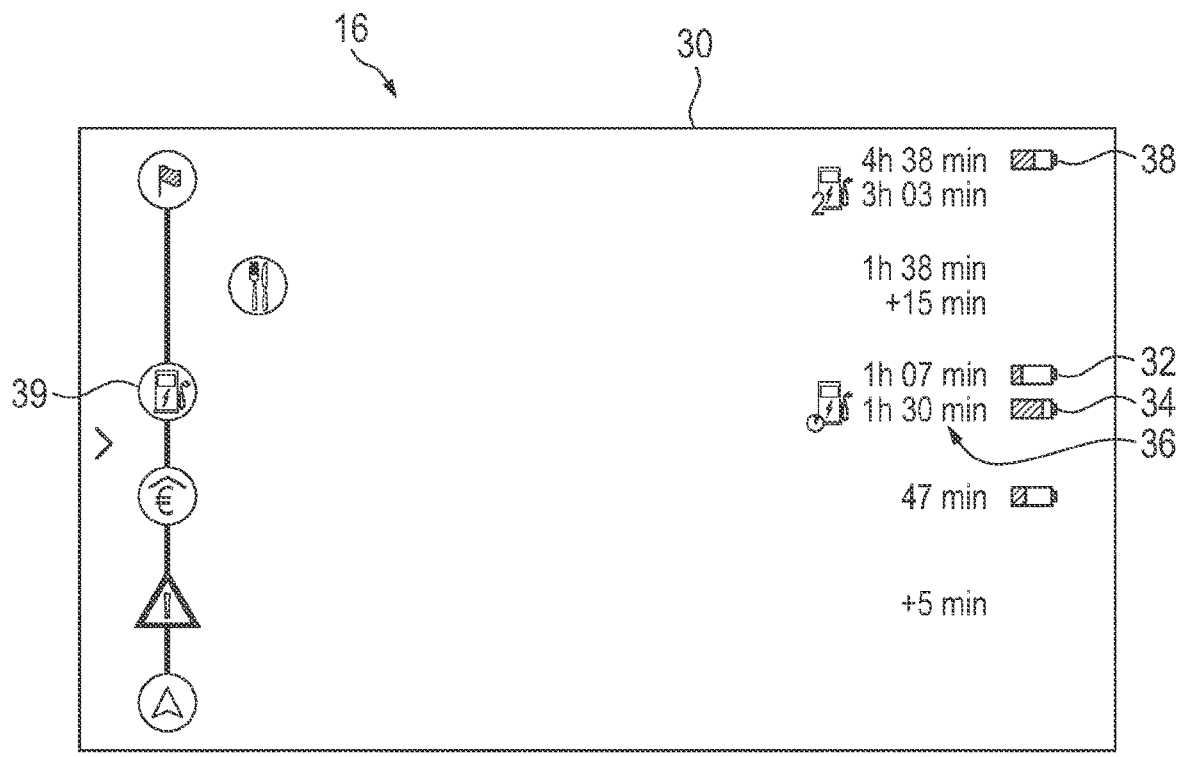
FIG. 6 shows a navigation route display according to an embodiment.
Figure 7:
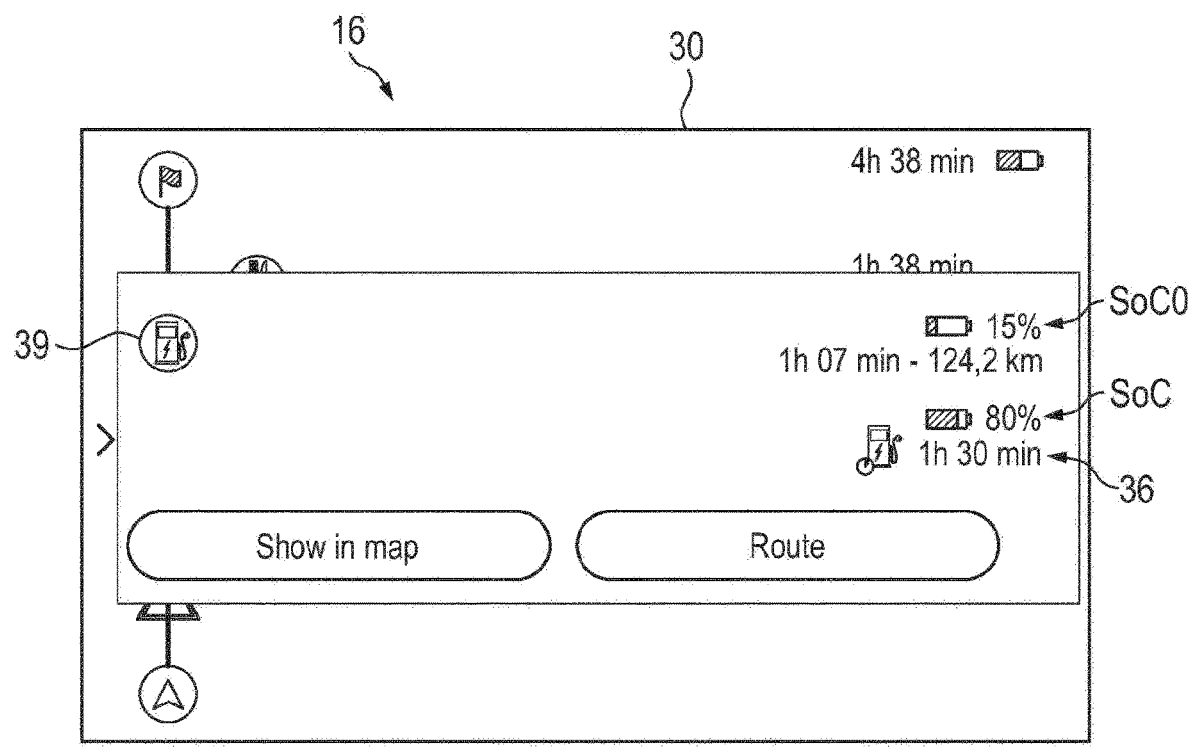
FIG. 7 shows a navigation route display according to a second embodiment.

Route views 30 according to embodiments are shown in FIGS. 6 and 7. In FIG. 6, according to a first embodiment, a route view 30 is shown on the display 16 for an example navigation route determined according to present teachings. In this case, a charging stopover is determined that is shown as a graphic charging stop object 39.

Furthermore, different determined states of charge are shown. For example, an arrival state of charge 32 is shown. The arrival state of charge 32 in this case is the determined state of charge of the battery 120 upon arrival at the charging stopover. This corresponds to the residual range at the charging stopover. The arrival state of charge 32 can for example be ascertained from the energy consumption, the distance to the charging stopover, and the current state of charge. Furthermore, a target state of charge 38 is also determined and displayed. The target state of charge corresponds to the residual range R at the navigation destination. As already described above, the arrival state of charge 32 and the target state of charge 38 imply the particular residual ranges at the charging stopover or at the navigation destination.

Furthermore, the minimum state of charge to be achieved can be shown as a departure state of charge 34. Furthermore, a charging time 36 can be shown. The charging time 36 until the minimum state of charge is achieved at the at least one charging stopover can for example be determined on the basis of the charging speed at the charging stopover, an ascertained arrival state of charge, and the minimum state of charge to be achieved at the at least one charging stopover.

FIG. 7 shows in greater detail in an exemplary second embodiment a route view 30 on the display 16 for an exemplary determined navigation route according to the present teachings. In this view, the arrival state of charge SoC0, here 15% for example, is furthermore determined and displayed. Furthermore, the minimum state of charge, in this case 80%, is also determined and displayed. In this exemplary case, the charging time 36 is a determined value of 1 hour, 30 minutes.

Figure 8:
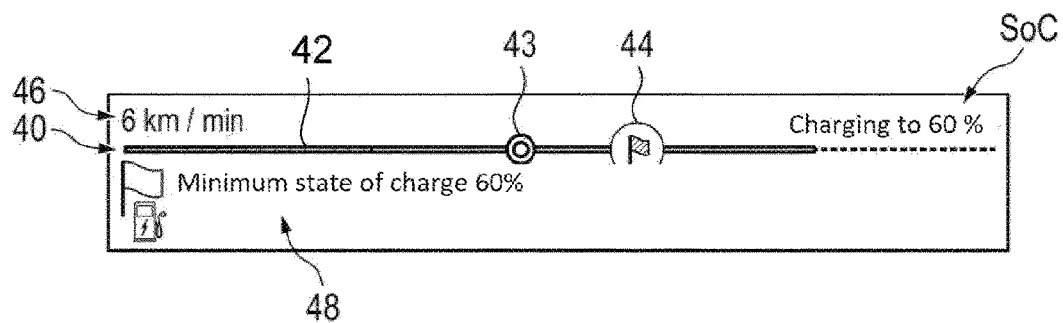
FIG. 8 shows a charging display according to an embodiment.

FIG. 8 shows a graphic charging display 40 according to an embodiment. The graphic charging display 40 can be shown on a display 16 during the charging process at the at least one charging stopover L1, L2. The charging display 40 comprises for example a movable state of charge object 42 that can be indicative of an actual state of charge of the battery 120. Furthermore, the charging display 40 comprises a charging target object 44 which is indicative of the minimum state of charge SoC to be achieved. In this case, the latter is, for example, determined to be 60%.

Furthermore, a charging preset 43 of the user is also displayed. The minimum state of charge SoC to be achieved is therefore higher than the charging preset 43 in this case. To achieve the desired target residual range R0 at the navigation destination N, the user must therefore charge more than the charging preset 43. Here, the minimum state of charge to be achieved therefore overwrites or overrides the charging preset of the driver. In other cases, the minimum state of charge SoC to be achieved can be less than the charging preset 43. The user can then save charging time in comparison to the charging preset 43. The user can furthermore monitor the charging speed 46, in this case 6 km/min, of the charging post. This charging speed 46 can be obtained from the charging post or saved beforehand in the navigation data together with the associated charging stopover.

Furthermore, the user can be shown charging information 48, for example in text format, containing for example the minimum state of charge to be achieved.

In another embodiment, transmission of a signal indicative of achieving the minimum state of charge SoC to be achieved can be transmitted to a mobile terminal M. To accomplish this, the motor vehicle 100 can furthermore have a communication interface K which is configured to transmit the signal from the control unit 14 to the mobile terminal M. This has the benefit that the user does not have to personally monitor the charging process or does not have to stay at the vehicle 100.

The invention has the benefit that a navigation route optimized with respect to the residual range is determined. The user therefore does not have to personally schedule a residual range and can adhere to the specifications, i.e., the charging stopovers and the associated minimum states of charge to be achieved. This provides that the user will not only reach the navigation destination but also has a given residual range at the navigation destination or at charging stopovers. This may avoid unnecessarily long charging times and unnecessary charging stopovers.

LIST OF REFERENCE NUMERALS

10 Device for range control
12 Sensor
14 Control unit
16 Display
20 Setting view
22 Slider
24 Button
30 Route view 32 Arrival state of charge
34 Departure state of charge
36 Charging time
38 Target state of charge
39 Charging stop object
40 Charging display
42 Movable state of charge object
43 Charging preset
44 Charging target object
46 Charging speed
48 Charging information
100 Motor vehicle
120 Battery/energy store
125 Electric motor/drive
K Communication interface
M Mobile terminal
N Navigation destination
R0 Recorded target residual range
R Residual range
LM Manual charging stop
LR0 Recorded charging stop residual range
LR Residual range
L, L1, L2 Charging stopover
SoC0 Arrival state of charge
SoC Minimum state of charge
SoC1, SOC2 Minimum state of charge
SoCM Minimum state of charge The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for range control for a motor vehicle comprising:
    selecting a navigation destination based on user input of a user of the motor vehicle using a user interface;
    obtaining a user-defined target residual range to be achieved at the selected navigation destination from the user using the user interface;
    determining current position data of the motor vehicle using a sensor of the motor vehicle;
    determining a navigation route to the navigation destination via at least one charging stopover while determining a minimum state of charge of a battery to be achieved at the at least one charging stopover by a control unit in such a way that the motor vehicle has the user-defined target residual range upon arrival at the navigation destination, which residual range is different from the minimum state of charge at the at least one charging stopover;
    selectively obtaining information about an additional user-defined charging stop from the user using the user interface;
    upon obtaining the information about the additional user-defined charging stop, updating the navigation route by the control unit via the additional user-defined charging stop;
    determining a minimum state of charge to be achieved at the additional user-defined charging stop such that the motor vehicle has the user-defined target residual range upon arrival at the navigation destination which residual range is different from the minimum state of charge at the additional user-defined charging stop;
    updating by the control unit the minimum stage of charge of the battery to be achieved at the at least one charging stopover taking into account the additional user-defined charging stop;
    optimizing charging durations at the at least one charging stopover and the additional user-defined charging stop based on charging speeds at the at least one charging stopover and the additional user-defined charging stop;
    controlling a navigation system with a display through the control unit for displaying the navigation route on the display; and
    upon initiating a charging process at the at least one charging stopover or the additional user-defined charging stop, portraying a graphic charging display on a display during the charging process, wherein the charging display comprises, at least during the charging process, a state of charge object which is indicative of the current state of charge of the battery, and an automatically determined charging target object which is indicative of the minimum state of charge to be achieved during the charging process to meet the obtained user-defined target residual range at the navigation destination.

2. The method of claim 1, comprising determining, through the control unit, the navigation route to the navigation destination such that the motor vehicle, upon arrival at the navigation destination, has a residual range that corresponds to the recorded target residual range.

3. The method of claim 2, comprising determining, through the control unit, the minimum state of charge to be achieved at the at least one charging stopover on the basis of a route to a closest charging stopover or to the navigation destination.

4. The method of claim 2, comprising determining, through the control unit, the minimum state of charge to be achieved on the basis of a charging speed at the at least one charging stopover.

5. The method of claim 2, comprising determining, through the control unit, the minimum state of charge to be achieved on the basis of energy consumption.

6. The method of claim 1, comprising determining, through the control unit, the minimum state of charge to be achieved at the at least one charging stopover on the basis of a route to a closest charging stopover or to the navigation destination.

7. The method of claim 6, comprising determining, through the control unit, the minimum state of charge to be achieved on the basis of a charging speed at the at least one charging stopover.

8. The method of claim 6, comprising determining, through the control unit, the minimum state of charge to be achieved on the basis of energy consumption.

9. The method of claim 1, comprising determining, through the control unit, the minimum state of charge to be achieved on the basis of a charging speed at the at least one charging stopover.

10. The method of claim 9, comprising determining, through the control unit, the minimum state of charge to be achieved on the basis of energy consumption.

11. The method of claim 1, comprising determining, through the control unit, the minimum state of charge to be achieved on the basis of energy consumption.

12. The method of claim 1, comprising determining, through the control unit, a charging time until the minimum state of charge is achieved at the at least one charging stopover on the basis of the charging speed at the at least one charging stopover, an ascertained arrival state of charge, and the minimum state of charge to be achieved at the at least one charging stopover.

13. The method of claim 12, comprising displaying the charging time, and/or the arrival state of charge, and/or the minimum state of charge to be achieved at the at least one charging stopover on a display.

14. The method of claim 1, comprising transmitting a signal, which is indicative of achieving the minimum state of charge to be achieved at the at least one charging stopover, to a mobile terminal.

15. The method of claim 1, comprising recording a charging stop residual range to be achieved at the at least one charging stopover, and determining the navigation route through the control unit such that the motor vehicle has a residual range at the at least one charging stopover which corresponds to at least the recorded charging stop residual range.

16. The method of claim 1, comprising determining the navigation route, or determining the navigation route according to determined intervals in time, through the control unit.

17. The method of claim 1, comprising determining, through the control unit, the navigation route to the navigation destination on the basis of the state of charge of the battery.

18. A device for range control for a motor vehicle comprising a user interface, a display and a control unit, wherein the device is configured to:
  select a navigation destination from a user of the motor vehicle using a user interface;
  obtain a user-defined target residual range to be achieved at the navigation selected destination from user input using the user interface;
  determine current position data of the motor vehicle using a sensor of the motor vehicle;
  determine a navigation route to the navigation destination via at least one charging stopover while determining a minimum state of charge of a battery to be achieved at the at least one charging stopover by a control unit in such a way that the motor vehicle has the user-defined target residual range upon arrival at the navigation destination which residual range is different from the minimum state of charge at the at least one charging stopover;
  selectively obtain information about an additional user-defined charging stop from the user using the user interface;
  upon obtaining the information about the additional user-defined charging stop, update the navigation route through the control unit via the additional user-defined charging stop;
  determine a minimum state of charge to be achieved at the additional user-defined charging stop such that the motor vehicle has the user-defined target residual range upon arrival at the navigation destination which residual range is different from the minimum state of charge at the additional charging stop;
  update the minimum stage of charge of the battery to be achieved at the at least one charging stopover taking into account the additional user-defined charging stop;
  optimize charging durations at the at least one charging stopover and the additional user-defined charging stop based on charging speeds at the at least one charging stopover and the additional user-defined charging stop:
    control a navigation system with a display through the control unit for displaying the navigation route on the display; and
    upon initiating a charging process, show a graphic charging display on a display during the charging process at the at least one charging stopover, wherein the charging display comprises, at least during the charging process, a state of charge object which is indicative of the current state of charge of the battery, and an automatically determined charging target object which is indicative of the minimum state of charge to be achieved to meet the obtained user-defined target residual range at the navigation destination.

19. A motor vehicle comprising a device for range control according to claim 18.

* * * * *